ULTRA-HIGH SPEED PUNCH

Original Filed Dec. 9, 1958 8 Sheets-Sheet 1

INVENTORS
JOHN H. MACNEILL
JAMES E. BELLINGER
BY Hurwitz & Rose
ATTORNEYS

ULTRA-HIGH SPEED PUNCH

Original Filed Dec. 9, 1958 8 Sheets-Sheet 2

INVENTORS
JOHN H. MACNEILL
JAMES E. BELLINGER
BY Hunnitz & Rose
ATTORNEYS

ULTRA-HIGH SPEED PUNCH

Original Filed Dec. 9, 1958 8 Sheets-Sheet 3

INVENTORS
JOHN H. MACNEILL
JAMES E. BELLINGER
BY Hurwitz & Rose
ATTORNEYS

ULTRA-HIGH SPEED PUNCH

Original Filed Dec. 9, 1958 8 Sheets-Sheet 4

INVENTORS
JOHN H. MACNEILL
JAMES E. BELLINGER
BY Hunnitz & Rose
ATTORNEYS

ULTRA-HIGH SPEED PUNCH

Original Filed Dec. 9, 1958 8 Sheets-Sheet 5

INVENTORS
JOHN H. MACNEILL
JAMES E. BELLINGER
BY Hurwitz & Rose
ATTORNEYS

ULTRA-HIGH SPEED PUNCH

Original Filed Dec. 9, 1958 8 Sheets-Sheet 6

INVENTORS
JOHN H. MACNEILL
JAMES E. BELLINGER

BY Hurwitz & Rose

ATTORNEYS

INVENTORS
JOHN H. MACNEILL
JAMES E. BELLINGER
BY Hurwitz & Rose
ATTORNEYS

INVENTORS
JOHN H. MACNEILL
JAMES E. BELLINGER
BY Kenneth v. Rose
ATTORNEYS

United States Patent Office

Re. 25,304

Reissued Dec. 25, 1962

25,304

ULTRA-HIGH SPEED PUNCH

John H. MacNeill, Melbourne, and James E. Bellinger, Eau Gallie, Fla., assignors to Soroban Eng., Inc., Melbourne, Fla., a corporation of Florida Original No. 2,962,208, dated Nov. 29, 1960, Ser. No. 779,038, Dec. 9, 1958. Application for reissue Feb. 21, 1961, Ser. No. 90,898

35 Claims. (Cl. 234—128)

Matter enclosed in heavy brackets [ ] appears in the original patent but forms no part of this reissue specification; matter printed in italics indicates the additions made by reissue.

The present invention relates to high speed punch devices for perforating record members and more particularly to an improved record member feeding mechanism and an improved record member perforating mechanism for such devices. Still more particularly the apparatus of the present invention constitutes an improvement of the record member punching and feeding mechanisms disclosed in United States Patent No. 2,859,816, issued on November 11, 1958, in the name of John H. MacNeill for High Speed Punch Devices, and co-pending United States patent application, Serial No. 664,351, filed in the names of John H. MacNeill and James E. Bellinger on June 7, 1957; both of these cases being assigned to the same assignee as the present application.

In both of the aforesaid co-pending patent applications there is provided a high speed punch device for selectively perforating a tape or other record member in accordance with a desired code; such as, a binary, trinary, hexadecimal, etc., code. Both of these mechanisms provide a vertically reciprocatable punch bail disposed above a plurality of aligned and vertically arranged punch pins extending perpendicular to the direction of travel of a record member. The bail is reciprocated through a distance insufficient to bring the bottom of the bail into engagement with the tops of the punch pins and in order to selectively actuate one or more of the punch pins a plurality of selectively positionable code interposers are provided. The code interposers are selectively slidable between first and second positions, and in the second position couple the bail to the punch pins so that the pins are positively driven downward through the record member.

It has been found in operation of these devices at very high speeds, which in the case of the latter punch, are of the order of magnitude of two-hundred and forty (240) punching cycles per second, that difficulty is experienced in maintaining the various parts of the mechanism lubricated. It is apparent that at such high punching speeds where various mechanical operations take place in the order of several hundred micro-seconds, the inertial forces are tremendous and that in consequence oil is thrown from the surfaces to be lubricated at a relatively rapid rate.

It is, therefore, one object of the present invention to provide a high speed punch mechanism wherein the lubrication problem is considerably reduced.

A major difficulty in developing a high speed punch mechanism is that of obtaining a reliable and accurate tape feed mechanism in spite of the fact that the mechanism must operate at extremely high velocities and accelerations. These difficulties are overcome in both of the devices set forth in the aforesaid patent and copending application so long as the punches are operated at the speeds for which they are designed. However, when an attempt is made to operate these mechanisms materially above their basic speeds, their lives are greatly reduced.

It is, therefore, another object of the present invention to provide a tape feed mechanism having both gradual acceleration and deceleration of the feeding mechanism and employing a minimum number of relatively movable parts so as to provide long life at operating speeds in the region of three hundred punching cycles per second.

In accordance with the apparatus of the present invention, and reference is initially made to the tape feed mechanism of the apparatus, there is provided a dog-clutch so that the drive member of the clutch is maintained in positive driving relationship with the driven member during both acceleration and deceleration of the clutch without requiring the application of an external force to maintain this relationship. The dog-clutch employed is a clutch wheel having a plurality of generally square-shaped teeth disposed about its periphery and a pawl-like member having a square-shaped finger which is adapted to be disposed between and substantially fill the space between the square teeth of the driven clutch wheel. In consequence of this arrangement, it is only necessary to accelerate and decelerate the pawl-like member in order to provide the necessary acceleration and deceleration of the feed mechanism. The total drive mechanism required therefore is the member which drives the pawl-like member and a member for selectively engaging and disengaging the pawl with and from the toothed wheel. It will be noted, however, that since a square finger is placed between square teeth, the pawl-like member cannot be withdrawn from the toothed wheel by simply returning it to its original position, as is the case of the pawl and ratchet, since to do so would merely rotate the wheel back to its starting position. Therefore, both positive engagement and disengagement between the pawl-like member, which will hereinafter be referred to as a pawl, and the wheel must be effected. Since both positive insertion and withdrawal must be effected, a dead period must be provided at both the beginning and end of the movement of the pawl from an initial to a final position. Such a drive function can be obtained by employing a constant diameter triangular cam and cam follower and coupling the feed mechanism directly to the cam follower. With regard to the punch mechanism; however, it is desirable to have a punch bail coupled to its cam follower through a frequency doubling mechanism so that there is only one dead interval for each cycle of operation of the punch mechanism; this interval being required for interposer insertion and withdrawal which occur at the same interval in the cycle. In order to maintain the punch and feed mechanisms in isochronism, the triangular cam for the feed and punch mechanisms is mounted on different shafts and the punch shaft is driven at one-half the speed of the feed drive shaft so that the utilization of the frequency doubling mechanism for the punch brings the punch operating frequency up to that of the feed mechanism.

In a first embodiment of the present invention, a drive sprocket, having teeth for engaging holes in the paper tape to be operated upon by the apparatus of the invention, is mounted on a hollow hub adjacent one end thereof. The toothed wheel of the dog clutch is formed adjacent the other end of the hollow hub, and upon engagement by and movement of the pawl the wheel is rotated so as to rotate the sprocket. The pawl is centrally pivoted about a shaft secured directly to a feed mechanism cam follower driven by a constant diameter triangular cam. The tooth of the pawl whiich is adapted to engage the clutch wheel is formed on one end of the pawl and the other end of the pawl is indirectly connected to the armature of an electromagnet which, when energized, causes the pawl to rotate about its central pivot and into or out of engagement with the clutch wheel depending upon direction of movement of the armature. At the beginning of each cycle of movement of the tape, a first electromagnet is energized to rotate the armature in a direction to cause the pawl to engage the toothed wheel and at the end of the cycle of movement, a second electromagnet is energized to withdraw the pawl tooth from engagement with the wheel and permit the pawl to be returned to its starting position.

In a second embodiment of the present invention, the armature of the electromagnet is so positioned with respect to the shaft on which the constant diameter, triangular cam is mounted that a second cam positioned on this same shaft engages the armature of the electromagnet and moves it in such a direction as to effect withdrawal of the pawl from the teeth of the clutch wheel.

In the second embodiment of the invention, the teeth of the clutch wheel are formed on the inner circumferential surface of the hollow sprocket hub and the pawl may be slid into and out of engagement with the teeth by directly connecting the pawl to the armature of the electromagnet and rotating the armature about its pivot which is remote from the pawl. The pawl is received in a slot formed in a shaft extending outwardly from the feed cam follower so that the rotative motion of the cam follower is imparted to the pawl in order to drive the clutch wheel. The slotted shaft also serves as a guide for the pawl during its movement into the out of engagement with the toothed wheel.

The second embodiment of the invention differs from the first embodiment primarily in the mechanism for effecting movement of the pawl. In the first embodiment of the invention, a differential electromagnetic arrangement is employed wherein one magnet is energized while the other is de-energized and wherein it is attempted to effect changes in state of energization of the magnets simultaneously. It is well known that inductance in a circuit tends to retard build-up of current and retard decay of current and in a differential arrangement such as set forth above both of these factors are encountered simultaneously. In consequence, the circuits for driving the magnets must be capable of delivering large amounts of energy in relatively short periods of time. As the rate of operation of the punch approaches 300 recordings per second the time interval available for effecting reversal of energization of the magnets is less than a millisecond, and the power handling capabilities of the magnet driving circuits becomes quite considerable.

In the second embodiment of the invention only a single driving magnet need be employed. Almost half of a complete recording cycle is available for establishing flux in the feed magnets armature as opposed to one-sixth of a cycle in the differential magnet arrangement of the first embodiment. Also, since the magnet armature is mechanically returned to its position remote from the driving magnet special techniques are not required to minimize the time required to collapse the magnetic field of the energized magnet.

As previously indicated one of the prime objectives of the present invention is to eliminate the difficulty encountered in attempting to maintain the various mechanisms of the punch lubricated. In order to accomplish this result in accordance with the present invention, the punch mechanism is inverted, that is, the punch pins instead of punching down now punch up and the lower half of the punch mechanism is disposed in an oil bath. The cam and cam follower of the punch mechanism are partially immersed in oil and splash oil through the remainder of the apparatus. The oil is prevented from reaching the tape since the punch pins fit relatively snugly in the holes formed in a punch guide and the guide wipes excess oil from the punches. The entire mechanism cannot be economically maintained in a complete oil bath since the viscosity of the oil would produce excess drive power requirements coupled with increased heat dissipation and therefore the punch cam is employed to splash oil throughout the apparatus. Certain components of the mechanism do not directly obtain sufficient oil from the splash system, such as the feed cam which is located well above the static oil level and the splashing punch cam and follower, and therefore the rotating shaft for the punch cam is formed into an Archimedes screw where it passes through its support housing to operate as an oil pump to feed oil directly onto the triangular feed cam and follower and supply oil to other mechanisms which require a constant flow of oil.

The combination of the novel feed mechanism of the present invention and of the novel punching arrangement provides an exceptionally high speed punch capable of operating at speeds up to roughly 300 punch cycles per second. Further, the punch is exceptionally long-lived and is substantially fool-proof so far as tearing of tapes as a result of operation by inexperienced personnel. The only maintenance requirement, other than replenishing the oil in the oil bath, is resharpening of the punch pins and it is anticipated that the pins will have to be sharpened only once every 1,000 hours of operation. The lubrication problem is materially reduced below that encountered in prior models and it is necessary only to maintain the level of the oil within the casing of the punch to within a rather liberal tolerance of the maximum filling level and therefore requires only a minimum of supervision by the operator.

It is another object of the present invention to provide an exceptionally high speed tape punching mechanism having a high degree of reliability, an unusually long life and requiring a minimum of maintenance of and care of the apparatus.

It is another object of the present invention to provide a high speed punch device which is lubricated from a combined oil splash and oil pump system that maintains all parts adequately lubricated and insures an extremely long life of the apparatus.

It is still another object of the present invention to provide a high speed punch device employing a positively engageable clutch mechanism and to provide a drive mechanism for the clutch mechanism which maintains the driving member of the mechanism stationary during intervals of engagement and disengagement with the driven member.

It is yet another object of the present invention to provide a high speed punch device employing a dog clutch having a pawl-like member and a toothed wheel and a mechanism for maintaining the pawl-like member stationary during intervals of coupling and decoupling with the toothed wheel and for driving the pawl to zero terminal velocity with high intermediate accelerations during the intervals between coupling and decoupling of the pawl to the toothed wheel.

It is another object of the present invention to provide a clutch having a pawl-like member and a toothed wheel in which the pawl-like member is rotated in one direction into engagement with the toothed wheel by electromagnetic means and is rotated in the other direction out of engagement with the toothed wheel by means of a power driven cam.

It is still another object of the present invention to provide a high speed punch device having a plurality of punch pins which punch a record member upon upward movement thereof and in which a portion of the apparatus disposed below the punch pins is maintained in an oil bath.

It is still another object of the present invention to provide a high speed punch device having a plurality of vertically reciprocable punch pins which are driven upwardly to effect a punching operation and a drive mechanism for the punch pins disposed therebelow; the driving mechanism being partially submerged in an oil bath and the punch pins being received snugly in a guide member to prevent oil from passing through the guide member and into the region of the member to be punched.

The above and still further objects, features and advantages of the present invention will become apparent upon consideration of the following detailed description of two specific embodiments thereof, especially when taken in conjunction with the accompanying drawings, wherein:

FIGURE 13 is a timing diagram of the modified apparatus of the invention.

Figure 1:
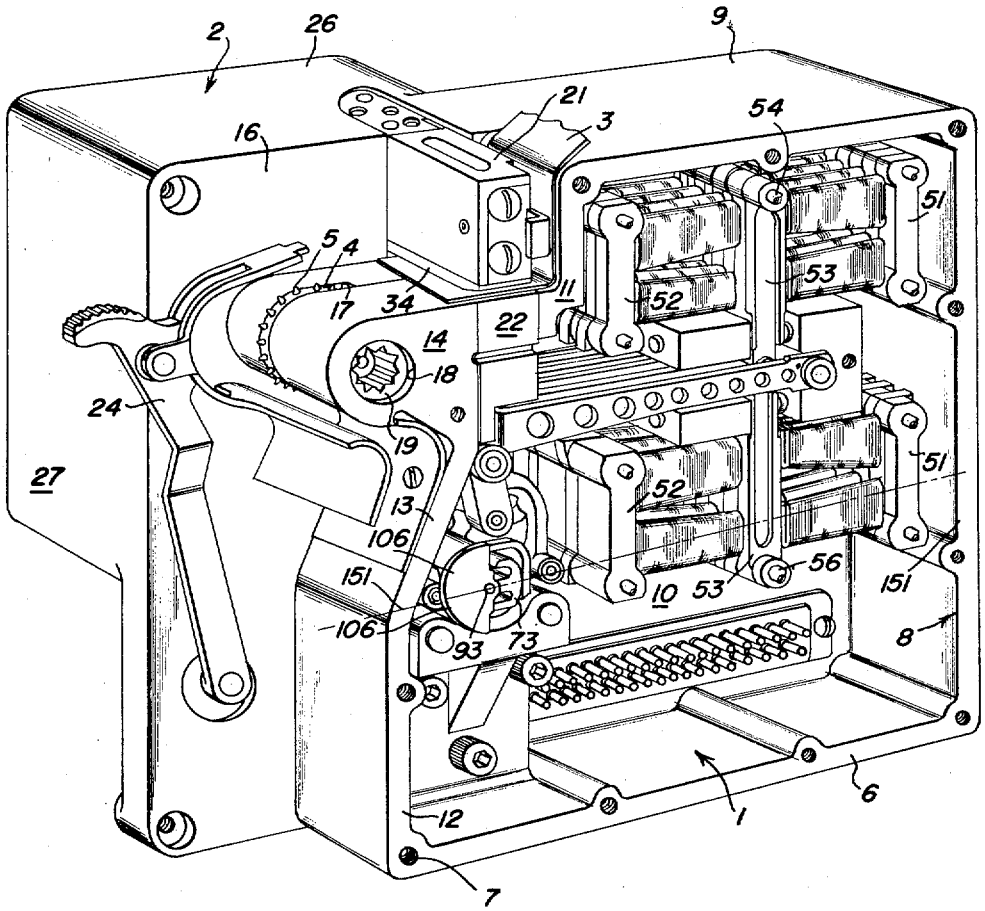
FIGURE 1 is a front, top and side perspective view of the apparatus of the present invention with the front cover of the apparatus removed.

Referring now specifically to FIGURE 1 of the accompanying drawings, the apparatus of the invention is divided primarily into two main compartments, a compartment 1 in which is disposed the punch actuating and control apparatus and a comparatment 2 in which is disposed the feed and punch drive mechanisms. The actual feed of the paper tape, which is designated by the reference numeral 3, is effected by a drive sprocket 4 having a plurality of radial, circumferentially spaced teeth 5. The punch compartment comprises a bottom wall 6 having a plurality of threaded apertures 7 for receiving bolts (not illustrated) which secure a front cover panel in liquid tight engagement to the compartment, the front panel having been removed to disclose the interior of the compartment. The compartment 1 further comprises a right side wall 8, a shortened top wall 9 which terminates in a downwardly extending shortened left side wall 11. The compartment 1 is provided with a back wall 10, and a lower left side wall 12 which is disposed forwardly of the wall 11 by about one-half the distance between the walls 11 and 8. The vertical portion of the wall 12 is relatively short and merges in a wall 13 which slopes upwardly and toward the wall 8. The wall 13 terminates in a hollow housing 14 which extends to the left as viewed in FIGURE 1, and has its front surface flush with the forward surface of the walls 6, 8, 9, 11, 12 and 13 and its rearward surface abutting a front wall 16 of the compartment 2. The forwardly extending hollow housing 14 is provided with a generally centrally disposed slot 17 extending perpendicular to the walls 8, 11 and 12 and which is adapted to receive the tape drive sprocket 4. The compartment 14 has a circular aperture 18 in its front wall which is adapted to receive a rotatable hollow shaft 19 on which the sprocket 4 is mounted.

The tape 3 extends downwardly immediately in front of the wall 11 and behind a chad receiving compartment and die plate support 21 which is secured to the wall 16 immediately above the compartment 1. The tape then makes a right angle bend coming under the chad receiving compartment and die plate support 21 and over the top surface of a punch pin guide 22. The tape, which is flush with the upper surface of the forwardly extending hollow compartment 14, proceeds over the sprocket wheel 4, extends downwardly and rearwardly passing under the compartment 14. A tape presser 24 of completely conventional design is also provided for holding the tape on the teeth 5 of the sprocket 4.

The compartment 2 is defined by a forward wall 16 which extends downwardly below the compartment 2 and is rigidly joined with or integrally formed with the wall 12 and extends part way into the left end of the compartment 1. The compartment 2 extends rearwardly as viewed in FIGURE 1 from the wall 16 and is defined by a top wall 26, a left side wall 27 and the right side wall (not illustrated), a bottom wall 29 and back wall 28, the latter two walls being illustrated in FIGURE 8 of the accompanying drawings.

Figure 2:
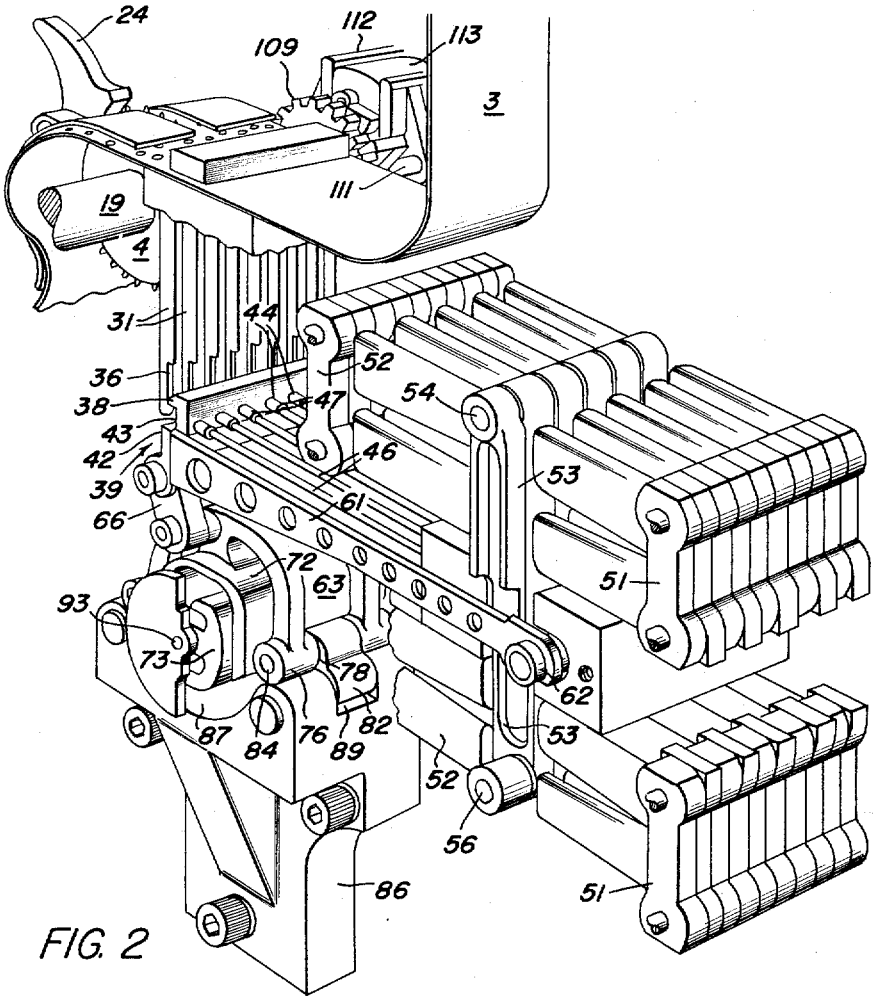
FIGURE 2 is a perspective view primarily of the punching mechanism of the apparatus of the present invention with the casing removed.
Figure 3:
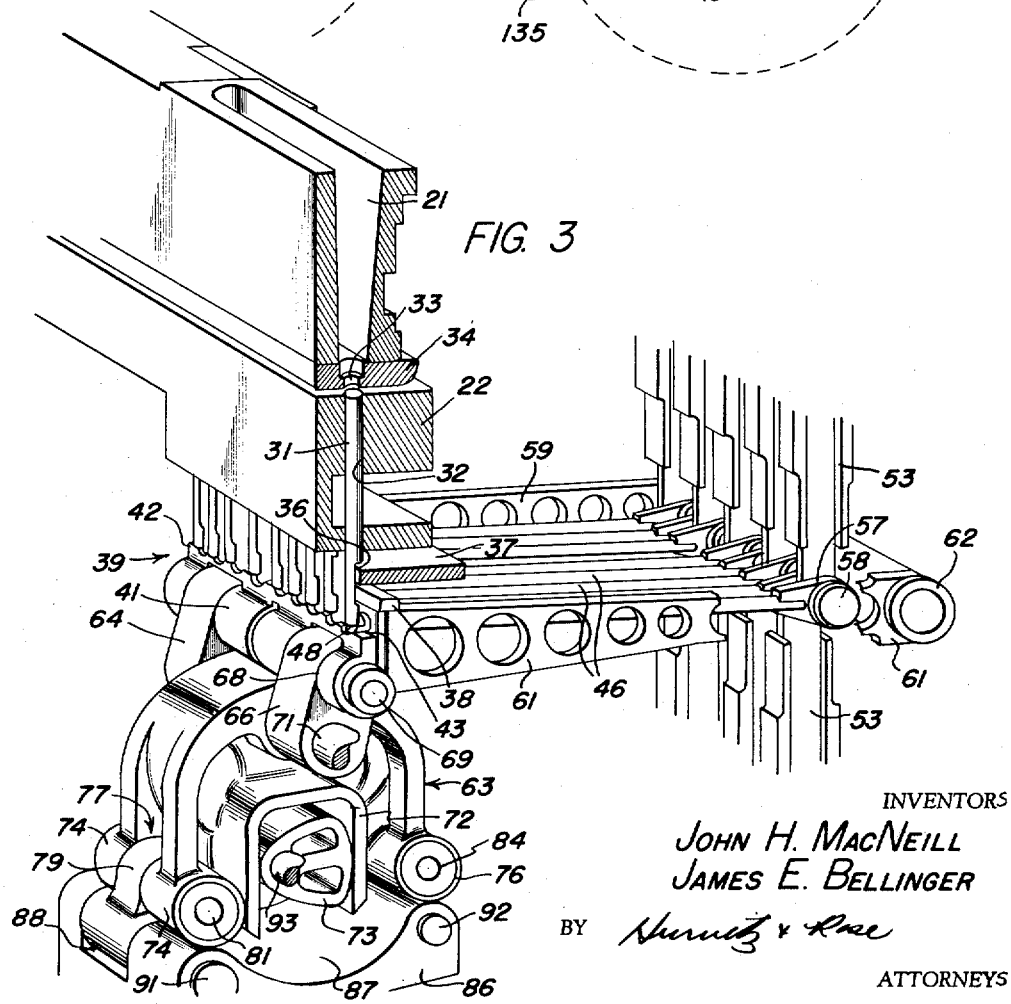
FIGURE 3 is a front and left and enlarged end view of the punch, punch bail and punch bail operating mechanism of the apparatus.
Figure 4:
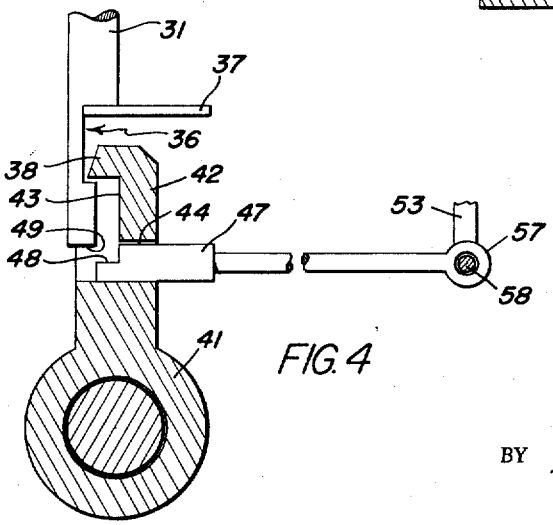
FIGURE 4 is an enlarged view partly in section of the punch bail and the interposers in the region of the bail as viewed from the front of the punch.

The punch mechanism of the apparatus is illustrated primarily in FIGURES 2, 3 and 4 of the accompanying drawings and reference is now made particularly to these figures. The punch mechanism comprises a plurality of cylindrical punch pins 31 which are vertically reciprocatable in apertures 32 in the punch guide 22. The punch pins 31 punch upwardly and into apertures 33 formed in a die plate 34 disposed immediately above the punch guide 22 and spaced therefrom by a distance just sufficient to pass the tape 3 between these two members. The punch die plate 34 forms the bottom wall of the chad receiving compartment 21; this compartment being adapted to receive the little circles of tape which are punched out of the record member upon upward movement of the respective punches. The punches are provided in their right surface, as viewed in FIGURES 3 and 4 and their forward surface as viewed in FIGURE 2, with generally rectangular recesses 36, the upper surface of which is adapted to engage a rectangular stop member 37 that has been removed from FIGURE 2 in order to clarify the illustration. Stop member 37 may be suitably secured to the guide member 22 or the wall 16.

The recesses 36 and the stop bar 37 define the lower limit of movement of the punches and these elements are arranged such that the tops of the punches are just below the upper surface of the guide 22 when the punches are in their downward or rest position. The lower surfaces defining the recesses 36 in the punch pins 31 are disposed below a forwardly extending, hook portion 38 of a punch bail generally designated by the reference numeral 39. The punch bail 39 comprises a hollow tubular lower portion 41 having a vertical generally rectangular member 42 extending upwardly therefrom. The upstanding member 42 is provided with a generally rectangular recess 43, the upper wall of which is defined by the hook portion 38. A plurality of apertures 44, and reference is now made to FIGURE 8, extend through the recessed portion 43 of the bail 39 with the apertures extending perpendicular to the axis of the hollow cylindrical portion 41. Each aperture 44 is adapted to receive a distinct interposer 46, the ends of which are provided with cylindrical punch engaging portions 47. The cylindrical portions 47 have a half cylindrical upper section removed to provide flat surfaces 48 which are adapted to be disposed under the punch pins 31. When the interposers are in the position illustrated in FIGURE 4; that is, in their rightmost position, upward movement of the bail 39, which also produces upward movement of the interposers 46 does not produce contact between the interposers and the punch pins 31. However, when the interposers 46 are shifted to the left, as viewed in FIGURE 4, the upper surface of the recesses 48 are disposed immediately under the punch pin bases 49 and the punch pins 31 are lifted during upward movement of the bail 39. Thus, by selectively shifting the interposers 46 to the left, as viewed in FIGURE 3, the punch pins are coupled to the bail 39 to produce a punching operation and when it is desired not to effect movement of a particular punch pin 31, the interposer 46 associated with that pin is maintained in its right hand position.

The movement of the interposers 46 is effected by groups of electromagnets 51 and 52, some of which are disposed above and some of which are disposed below the interposers. Each magnet is provided with a distinct armature 53, those associated with the magnets above the interposers 46 being rotatably mounted on a shaft 54 which is secured to the back wall 10 of the compartment 1. The armatures 53 associated with the magnets disposed below the interposers are rotatably mounted on a shaft 56 also secured to the back wall 10 of the compartment 1. Referring now specifically to FIGURE 2, the ends of the armatures 53 remote from the shafts 54 and 56 are formed into apertured circular sections (not illustrated) and are aligned along an axis parallel to and about equidistant from the shafts 54 and 56. Each of the interposers 46 terminates at its right end in an apertured circular member 57 and each member 57 is rotatably mounted on a distinct rivet 58. Each of the apertured sections 57 of the interposers 46 is rotatably secured to one of the rivets 58 so that each armature 53 is paired off with a different interposer 46. Thus, when one of the electromagnets 52 is energized and attracts its armature 53, the armature rotates about its associated shaft 54 or 56, and the end of the armature connected to one of the interposers 46 is moved to the left also moving the interposer in the same direction. The arc of movement of the armature 53 is quite small and since the interposer 46 is rotatably secured to the armature 53, the interposer is subjected to a translatory rather than an oscillatory motion. When it is desired to retract the interposers 46; that is, move them to the right, the appropriate electromagnets 51 are energized and the upper armatures 53 rotate counterclockwise and the lower armatures rotate clockwise about their respective shafts, thereby retracting the associated interposers. The number of interposers and the number of apertures 46 in the bail 39, which numbers must of course be equal, are determined by the number of punch pins 31 which are employed in the apparatus. Standard paper tapes are now being employed for 5, 6, 7 or 8 hole codes and the apparatus of the invention may be provided with the number of pins required for punching a desired code. Alternatively, a single punch configuration employing eight code punch pins may be employed and only those which are required for a particular code are utilized at any given instant. Besides the punch pins required for punching the 5, 6, 7 or 8 code holes, one punch pin is employed to punch feed holes in the tape 3 and this pin is permanently connected to the bail 39 so that it punches a hole each cycle of movement of the bail. Of course, if the logic so required, this pin could also be controlled by electro-magnets as are the code hole punches, and in such an arrangement, nine magnet pairs would be provided as illustrated in FIGURE 2.

The bail 39 is constrained to move vertically by means of parallel arms 59 and 61, each of which has one end secured to a different edge surface of the bail 39, particularly in the region of the upstanding member 42. The arms 59 and 61 extend from the edges of the bail 39, and parallel to the interposers 46, to a position to the right, as viewed in FIGURE 3, of the interconnection of the interposers and the armatures 53. The right ends of the arms 59 and 61 are rotatably disposed on a shaft 62 which is arranged to the right of the armatures of the magnets. The vertical movement of the bail is substantially linear due to the length of the arms 59 and 61 and the total movement required of the bail 39 which is of the order of magnitude of only a few hundredths of an inch.

The mechanism for producing vertical movement of the bail 39 is a cam follower apparatus 63 having links 64 and 66 interconnecting the bail 39 and the apparatus 63. The links 64 and 66 extend into slots 67 and 68, respectively, in the hollow cylindrical portion 41 of the bail 39 and a shaft 69 extends through the hollow member 41 and through suitable apertures in the upper ends of the links 64 and 66. The lower end of the links 64 and 66 are supported on a shaft 71 which extends through suitable apertures in the links and in the upper portion of the cam follower mechanism 63. The cam follower mechanism 63 is an inverted generally U-shaped member having a hardened insert defining the inner surfaces of the U-shaped member and constituting a cam follower 72 which is adapted to engage a constant diameter, triangular cam 73. The mechanism 63 terminates at the lower ends of the two legs of the U in hollow cylindrical portions 74 and 76 having vertical slots 77 and 78, respectively, formed therein. A portion of a link 79 extends into the slot 77 and is rotatably secured therein by means of a shaft 81 which extends through the hollow member 74 parallel to shaft 71 and through a suitable aperture in the upper end of the link 79. Similarly, a link 82 extends into the slot 78 formed in the hollow cylindrical member 76 and is rotatably secured therein by a shaft 84 which extends through the hollow member 76 and through a suitable aperture in the upper end of the link 82. A support member 86 is secured to the wall 16 of the punch immediately to the right of the walls 12 and 13 and within the compartment 1. The member 86 is provided with a concave upper surface 87 having slots 88 and 89 formed in its side walls. The slots 88 and 89 receive the lower end of the links 79 and 82 which are rotatably supported within the slots by means of shafts 91 and 92, respectively, which pass through suitable apertures in the links 79 and 82 and in the support member 86.

The cam 73 is a constant diameter, triangular cam supported on a shaft 93 which is coaxial with the center of curvature of one of the surfaces of the triangular cam. This configuration of cam and cam follower provides a drive mechanism in which the inner surfaces of both of the legs of the cam follower 72 are always in contact with the cam 73, thereby eliminating the need for springs for biasing the cam follower against the cam. Upon rotation of the cam 73, the cam follower 72 is moved first in one direction and then in the other; that is, left and right or right and left as viewed in FIGURE 3 so that the entire mechanism is translated to the right and left upon rotation of the cam 73. The translation of the cam follower 72 produces vertical reciprocation of the mechanism 63 as it rotates about the shafts 81 and 84. It will be seen that when the mechanism 63 is to its far right position as illustrated in FIGURE 3, it is in a lowermost position. Upon movement of the mechanism toward the left, the links 79 and 82 become vertically disposed, thereby raising the mechanism 63 and also raising the bail 39. When the mechanism 63 has reached its leftmost position it is again in its lowermost vertical position and the bail 39 has been retracted to its lowermost position. This arrangement may be more readily seen by reference to the uppermost series of diagrams of FIGURE 9 of the accompanying drawings, where the zero degree position designates the position of mechanism 63 when the links 79 and 82 are inclined toward the left and the cam 73 has a surface "a" in engagement with the left leg of the cam follower 72. Through the first 60° of rotation of the cam 73, in a counterclockwise direction, no movement is imparted to the cam follower 72, since the cam shaft 93 is located at the center of curvature of the surface "a" and this surface is subtended by a 60° arc. Upon continued rotation of the cam 73 so that a surface "b" thereof comes into engagement with the left wall of the follower 72, a surface having a gradually decreasing displacement from the shaft 93 is brought into engagement with the follower 72 and the follower is initially moved toward the right. The links 79 and 82 rotate about their respective shafts 91 and 92 and the cam follower 72 rises. The displacement imparted to the bail 39 can be seen by reference to the graph disposed immediately below the diagrammatic illustrations of the cam follower mechanism 63.

Initially upward motion of the punch bail occurs at a low velocity and relatively small displacements take place during this interval. However, as a surface "c" of the cam 73 comes into engagement with the left wall of the follower 72, the punch bail 39 is raised very rapidly and obtains a maximum upward position at 120° of rotation of the cam 73 when the links 79 and 82 are vertical. Continued rotation of the cam 73 displaces the mechanism 63 completely to the right and the bail 39 is retracted to its lowermost position at 180° when the upper ends of the links 79 and 82 are displaced as far as possible to the right. During the next 60° of rotation, the surface "a" of the cam 73 now comes into contact with the right hand leg of the cam follower 72 and another interval is provided, between 180° and 240°, at which the cam follower 72 and therefore the bail 39 are not moved. The cycle of operation during the next 120° of rotation of the shaft, produces rotation of the links 79 and 82 back through their central position, at which point they are vertical, to their leftmost position, which is the same as in the original zero degree position. Thus, during each complete cycle of rotation of the shaft 93, the punch bail 39 is moved to its uppermost position and returned to its lowermost position two distinct times. The elements comprising the links 79 and 82, mechanism 63 and links 64 and 66, constitutes a frequency doubling mechanism so that the bail 39 is moved upwardly twice and produces two punching operations for each revolution of the cam 73. This arrangement permits the shaft 93 to be run at half the speed that would otherwise be necessary if a non-frequency doubling linkage were employed and results in a reduction in wear on the mechanism, simplifying the problem of lubrication since the parts are moving at lower speeds than in an arrangement which did not employ frequency doubling.

Figure 5:
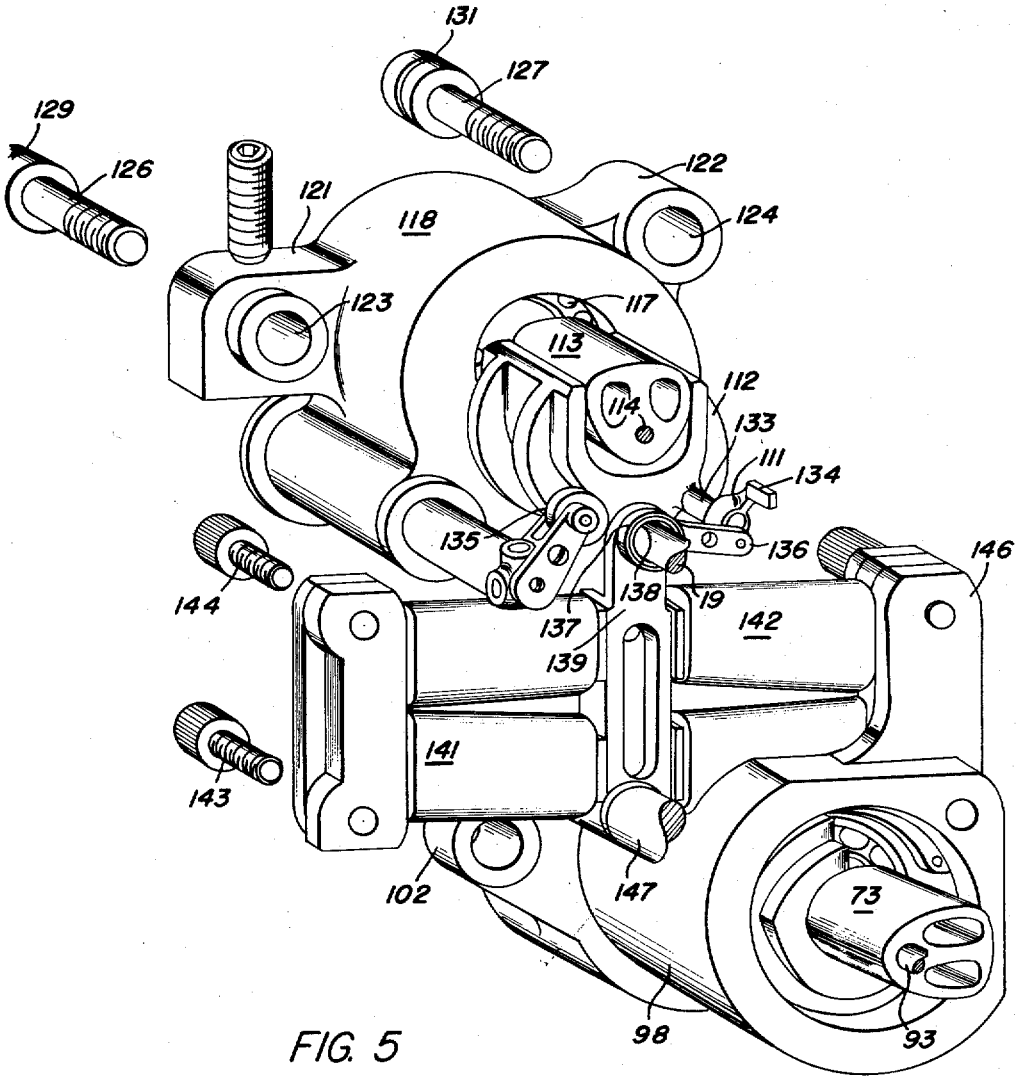
FIGURE 5 is an enlarged perspective view of the basic driving mechanisms of the apparatus of the present invention.

Referring now again to FIGURES 5 and 8 for the details of the support and drive mechanism for the shaft 93 and of the entire feed mechanism, the shaft 93 is rotatably supported within a housing 98 by ball bearing assemblies 99 and 101. The housing 98 carries apertured ears 102 (only one of which is illustrated in FIGURE 5) which set against and are bolted to bosses formed on the walls of the compartment 2 in order to support the housing. A short length of the shaft 93, rearwardly of the bearing assembly 101, is formed into an Archimedes screw 96 and is disposed within a sleeve 97 situated between the ball bearing assemblies 99 and 101. The sleeve 97 and the housing 98 are provided with an inlet aperture 103 and an outlet aperture 104 so that upon turning of the shaft oil may be drawn through the aperture 103 and pumped through the outlet aperture 104 in order to pump oil from the lower region of the housing to selected upper regions thereof.

The shaft 93 extends through the housing 98 and through an aperture 100 in the rear wall 28 of the compartment 2. Suitable shaft packing members 105 are disposed about the shaft 93 to prevent leakage of oil through the aperture 100.

As previously indicated the tape feed mechanism comprises a drive sprocket 4 rotatably mounted on a shaft 19 which is supported in a side wall of the forward extension 14 of the housing. The sprocket 4 actually constitutes one end of a hollow hub 107 which extends through and is rotatably supported in an aperture 108 in the front wall 16 of the compartment 2. An oil seal 108' is also placed across the opening 108 to prevent oil pumped into the upper region of compartment 2 from splashing into the hollow extension 14. The hub 107 terminates inwardly of the compartment 2 in a toothed wheel 109 having square teeth 110, the toothed wheel 109 comprising the driven element of a dog clutch, the driving element of which is a pawl-like member 111. The shaft 19 extends completely through the hollow hub 107, coaxial therewith, and is secured to the base of a generally U-shaped feed cam follower 112, the shaft 19 providing the only support for the cam follower. The shaft 19 is disposed in the transverse center of the base of the cam follower 112 and the cam rocks about the shaft as its center. The cam follower 112 has a constant diameter, triangular cam 113 disposed between its upright legs, the cam 113 being supported on a shaft 114 which is coaxial with the center of curvature of one of its surfaces. The shaft 114 is suitably supported in roller bearings 116 and 117 within a housing 118 having outwardly extending lobes or ears 121 and 122. The ears 121 and 122 are provided with bolt receiving apertures 123 and 124, respectively. Bolts 126 and 127 extend through apertures (not illustrated) in the rear wall 28 of the compartment 2, pass through the apertures 123 and 124 of the lobes 121 and 122 and are threadedly received in bosses, not shown, on wall 16 of enclosure 2. The apertures 123 and 124 are relatively large for the bolts 126 and 127 so that the housing 118 may have a limited degree of movement with respect to the remainder of the apparatus in order to adjust the position of the teeth 5 of sprocket 4 relative to the punch pins 31. The distance between the punch pins 31 and the sprocket teeth 5 must be exactly determined since the punch pins produce the holes in the tape 3 which receive the sprocket teeth 5 and the sprocket teeth 5 must be at the proper distance from the punch pins.

O-rings 129 and 131 are disposed about the bolts 126 and 127 and contact the outer surface of wall 28 to prevent leakage of oil through the wall 28 and a special oil seal 132 is disposed about the shaft 114 where it passes through the wall 28. The oil seal 132 is flexible to a certain degree and permits movement of the shaft 114 with respect to the center of the aperture through the housing wall 28.

Returning now to the dog clutch mechanism, the pawl-like member 111 is pivotally secured to the cam follower housing 112 by means of a shaft 133 which intersects the pawl 111 intermediate its two ends. The upper end of the pawl 111 terminates in a tooth 134 which is generally parallel to the shaft 133 and extends toward the toothed wheel 109 and vertically overlaps it so that when the pawl is moved in an appropriate direction, the tooth 134 can engage teeth 110. The lower end of the pawl is pivotally secured to a link 136, and reference is now made to FIGURES 6 and 7, which terminates in an enlarged hollow portion 137 disposed about the shaft 19. The hollow portion 137 of the link 136 is rotatably mounted on a hollow collar 138 which is formed as an extension on the upper end of an armature 139 of electromagnets 141 and 142. The magnet 141 is secured to the front wall 16 of the compartment 2 by means of bolts 143 and 144 whereas the electromagnet 142 is secured to an upwardly extending arm 146 of the punch cam shaft housing 98. The armature 139 is rotatably secured to a shaft 147 which is supported in the walls 16 of the compartment 2 and is parallel to the shafts 19 and 114. In FIGURE 8 the electromagnet 141 has been eliminated so as to illustrate the armature 139 and its mounting more clearly.

Figure 6:
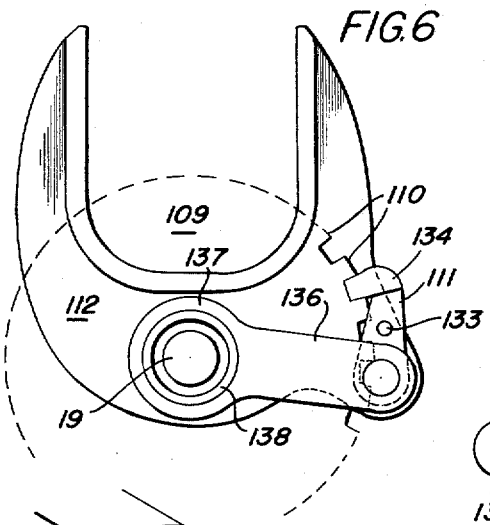
FIGURES 6 and 7 are diagrammatic views illustrating the operation of the dog clutch employed in the feed mechanism of the apparatus of the invention.
Figure 7:
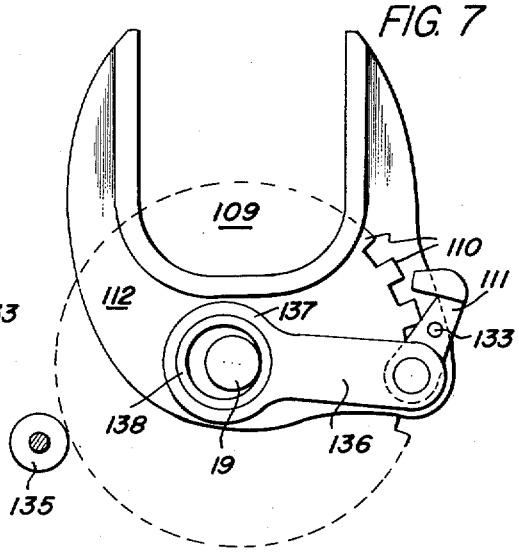
Figure 8:
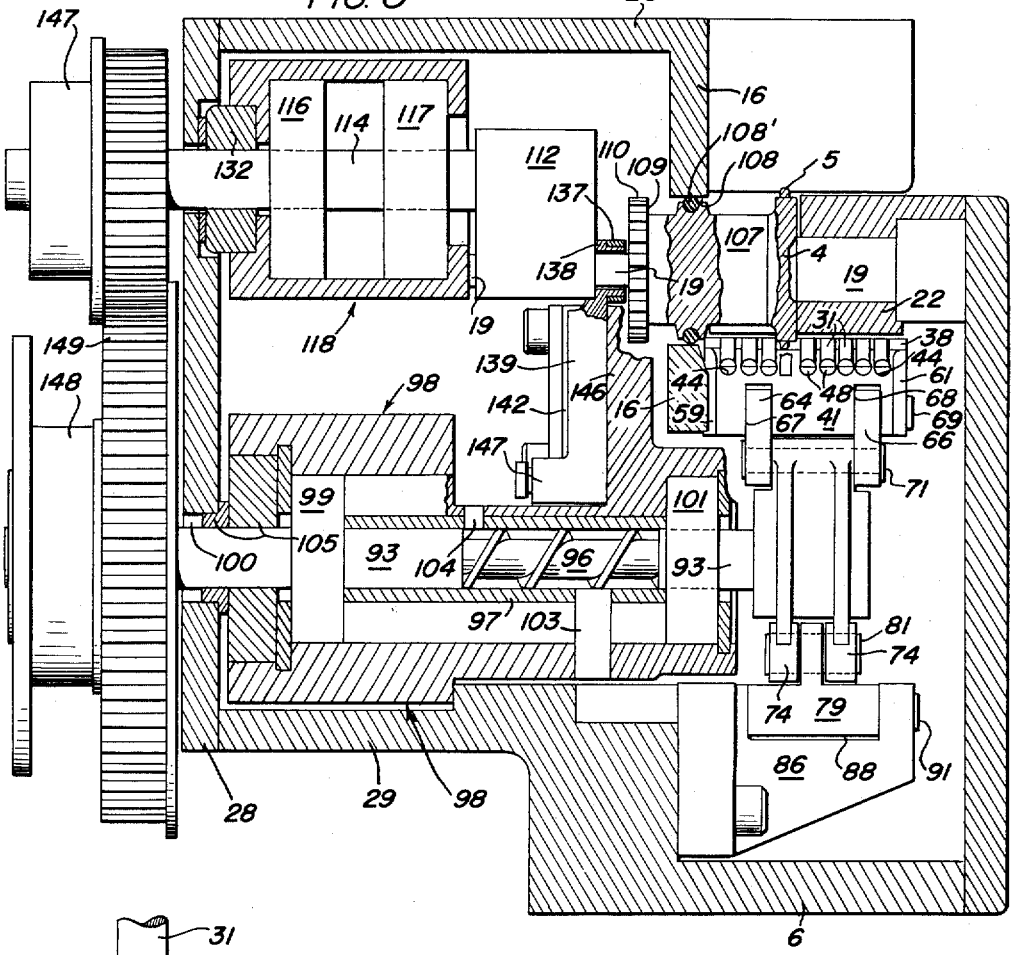
FIGURE 8 is a side section view of the apparatus, illustrating the punch and feed actuating mechanisms.

During the intervals when the feed mechanism is not actuated, the magnet 141 is energized, the armature 139 is rotated about the shaft 147 counterclockwise and assumes a position relative to the shaft 19 as illustrated in FIGURE 7. The position illustrated in FIGURE 7 is such that the hollow portion 137 of the link 136 and the collar 138 secured to the upper end of the armature 139, are off-center of the shaft 19 and more particularly the right inner surface of the collar 138 is almost in contact with the shaft 19. Upon energization of the magnet 142 the armature 139 is rotated clockwise about the shaft 147 and assumes the position as illustrated in FIGURE 6 wherein the hollow portion 137 of the link 136 and the collar 138 of the armature 139 are nearly coaxial with the shaft 19. Movement of the link 136 to the right, as viewed in FIGURE 6, rotates the pawl 111 counterclockwise about the shaft 133 until the tooth 134 of the pawl is disposed between similarly shaped teeth 110 on the toothed wheel 109. Subsequent re-energization of the magnet 141 moves the link 136 to the left, rotating the pawl 111 clockwise so that the tooth 134 is withdrawn from between the teeth 110 of the wheel 109 and the pawl assumes the position illustrated in FIGURE 7. It will be noted that the tooth 134 of the pawl 111 is dimensioned to fit snugly between the square teeth 110 of the wheel 109 and therefore the pawl 111 must be rotated both into and out of engagement with the wheel 109.

The pawl 111 at the beginning of a tape feed cycle is rotated about shaft 133 into engagement with the wheel 109 and is then rotated counterclockwise about shaft 19 upon counterclockwise rotation of the cam follower. Rotation of the pawl about the shaft 19 rotates the toothed wheel 109 a predetermined distance and results in advance of the tape 3. The pawl 111 must then be withdrawn from between the teeth 110 on the wheel 109 before being returned to its starting position or the wheel 109 would be returned to its original position. In this respect the dog clutch differs from a conventional pawl and ratchet since in the latter arrangement the pawl is disengaged from the ratchet by merely returning it to its initial drive position. The toothed wheel has associated therewith a spring loaded detent 135 to maintain it in a given position during those intervals that it is disengaged from the pawl 111.

Another specific feature of importance in the present invention is the fact that the link 136 has its apertured member 137 disposed coaxially of the shaft 19 when the pawl 111 is in engagement with the toothed wheel 109. Since the cam follower 112, the wheel 109, and the link 136 rotate about the shaft 19, the tooth 134 of the pawl 111 is rotated about the same center of rotation as the wheel 109 and no relative movement occurs between the tooth and the wheel. In consequence wear of the teeth of the pawl and wheel is minimized.

Figure 9:
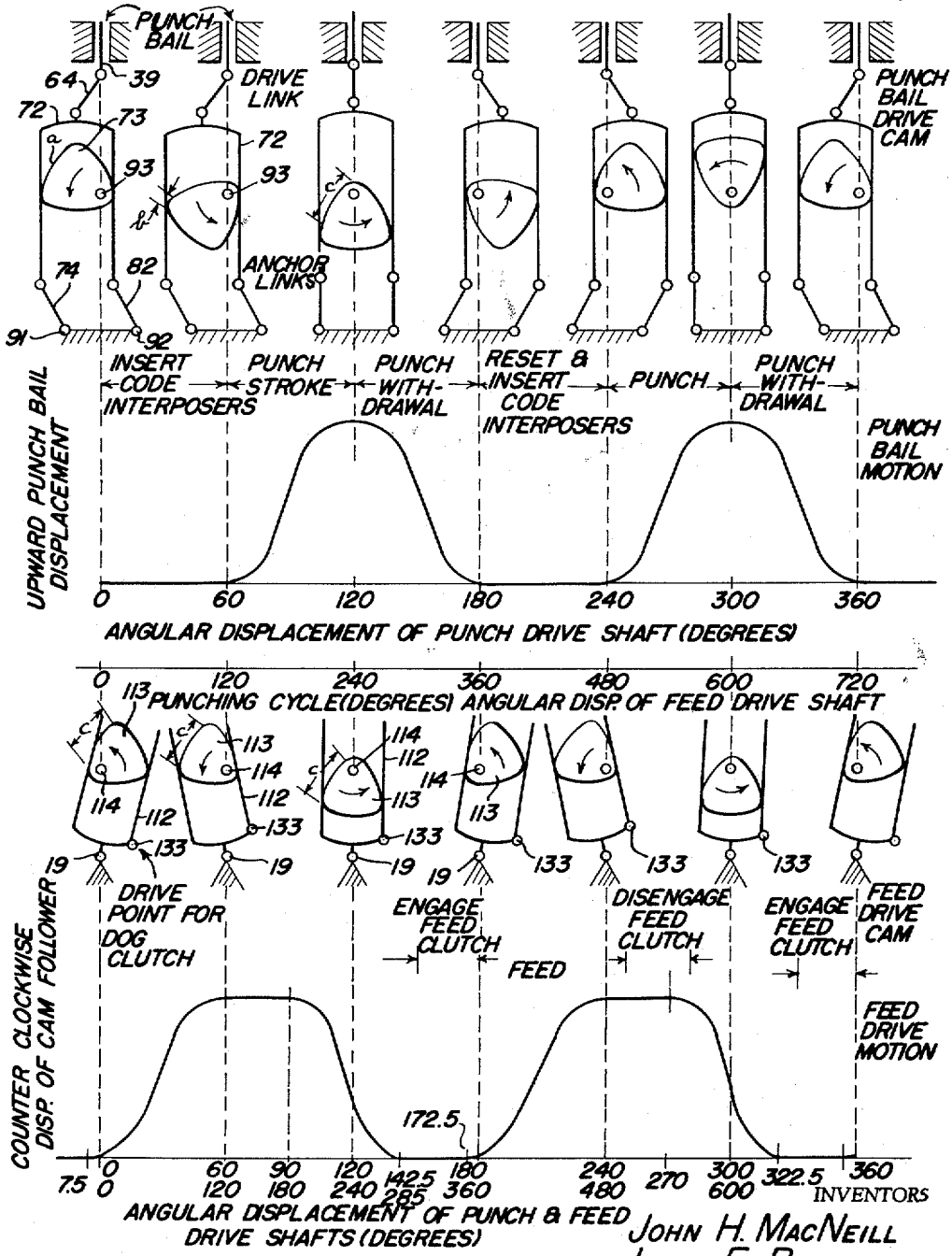
FIGURE 9 is a timing diagram for the apparatus of the present invention.

Reference is now made to the lower portion of FIGURE 9 of the accompanying drawings, which illustrate the timing diagram of the feed mechanism. Initially, it should be noted that the shaft 114 on which the cam follower 113 is disposed rotates at twice the rate of rotation of the shaft 93 on which the cam 73 is disposed. The reason for this will become apparent subsequently. The shaft 133 on which the pawl 111 is rotatably mounted is illustrated in FIGURE 9, as secured to the lower right portion of the cam follower 112 and the zero or starting position of the cam 113 is illustrated at a point when the surface "c" of the cam is engaging the left hand wall of the cam follower 112. The timing graph for the feed mechanism is in proper relationship with respect to the timing graph for the punch mechanism so that the relative times of the various events in each of these mechanisms may be directly compared. The cam 113 rotates counterclockwise and initially, since the surface "c" of the cam is in engagement with the left hand wall of the follower 113, the follower is rotated counterclockwise about the shaft 19 carrying the pawl 111 with it. Immediately prior to this operation the pawl has been brought into engagement with the tooth wheel 109. Therefore, as the follower 112 rotates, the wheel 109 is rotated through a predetermined arc through the first 60° of rotation of the punch shaft 93 which occurs during the first 120° of rotation of the shaft 114. At the end of this interval, the surface "a" of the cam 113 is in engagement with the left hand wall of the follower 112 and therefore an interval is provided during which the cam follower 112 does not move. This interval constitutes 30° of the rotation of the punch cam shaft but 60° of the feed mechanism cam shaft 114. During this interval the pawl 111 is withdrawn from engagement with the toothed wheel so that upon subsequent clockwise rotation of the cam follower 112, the pawl 111 is returned to its starting position but the wheel 109 remains unaffected. At 90° of rotation of the punch shaft or 180° of rotation of the feed shaft another surface "c" of the cam 113 engages the left wall of the follower 112 and the follower begins to rotate clockwise about the shaft 19. At 142½° of the rotation of the punch shaft and 285° of rotation of the feed shaft 114, the cam follower 112 is returned to the position illustrated in its zero degree designation; that is, is rotated to its maximum extent clockwise. From 142½° to 172½° or 285° to 345° of the feed shaft the surface "a" engages the right wall of the follower 112 and therefore the follower remains stationary. At the beginning of this interval the magnet 142 is energized to move the pawl into engagement with the toothed wheel 109 so that upon subsequent counterclockwise rotation of the follower 112 about the shaft 19 the toothed wheel is again rotated counterclockwise.

It will be noted that at the 180° position of the rotation of the punch shaft 93, one complete feeding cycle has been accomplished as has one complete punching cycle. It will also be noted, however, that during this first 180° of rotation, the feed mechanism has had a single interval of 60° during which the cam follower has been stationary while the feed mechanism has had two 30° intervals during which the feed mechanism remains stationary. Also, the toothed wheel 109 is rotated during the minus 7½° to 60° interval of rotation of the punch shaft during which the shaft 93 of the punch withdraws the punch pins and then holds them stationary. The 7½° of overlap occurs while the punch pins are being retracted into the guide block to strip the paper. Hence, early initiation of feed helps strip the paper from the pins and does not adversely affect performance. During the interval from 60° to 180° of rotation of the punch shaft, when a punching operation is effected, no motion is imparted to the toothed wheel since during the first and last 30° of this 120° interval, the cam follower 112 is stationary and during the interval from 90° to approximately 142½° of rotation of the punch shaft, the pawl is being returned to its most clockwise position, and is disengaged from the toothed wheel. The above timing features of the apparatus insure that punching does not occur during feeding and feeding does not occur during punching.

As previously indicated, the shaft 114 rotates at twice the speed of rotation as the shaft 93. The frequency doubling mechanism comprising links 79 and 82 in the punch bail during mechanism doubles the frequency of the punching mechanism so that the frequency of the punching and feed operations are the same, but obviously are phase displaced by appropriate placement of the cams 73 and 113 on their respective shafts. The reason for operating the shaft 114 at twice the speed as the shaft 93 so as not to require a frequency doubling mechanism is to obtain the two separate and distinct intervals during which the cam follower 112 is stationary. The first of these intervals allows insertion of the pawl 111 between the teeth 110 of the toothed wheel 109, while the second interval permits subsequent withdrawal of the pawl at the end of the predetermined angle of rotation of the toothed wheel.

The mechanism for maintaining the shafts 93 and 114 in isochronism, that is, in a fixed phase relation, comprises a pulley 147 secured to the shaft 114 externally of the compartment 2 and a pulley 148 secured to the shaft 93 also externally of the compartment 2. The pulleys 147 and 148 are coupled together by a toothed belt 139 which is disposed about both of the pulleys and either of the shafts may be driven. The relative sizes of the pulleys 148 and 147 are such that the shaft 93 is driven at one half the speed of the shaft 114.

Returning now to the timing diagrams of FIGURE 9, and reviewing briefly an entire cycle of operation of the punch, during the first 60° of rotation of the punch shaft, the selected interposers 146 are moved into position under the appropriate punch pins and during this same interval the toothed wheel 109 is optionally rotated through a predetermined arc to bring a new section of tape 3 into position above the punch pins. During the next 120° of rotation of the punch shaft 93, the punch bail is moved upwardly carrying the selected punch pins upward through the tape 3 and into the apertures 33 in the guide block 34 and subsequently returns the punch pins to their initial downwardmost position in which position they are withdrawn from the holes in the tape 3. During the same 120° interval, through 60° and 180° of rotation of the punch cam shaft, the pawl 111 is withdrawn from the toothed wheel 109 and returned to its initial position at 142.5° of rotation of the shaft and during the next 30° of rotation of the shaft the pawl is again inserted between the teeth 110 on the wheel 109. This completes a complete cycle of operation and the same cycle is optionally repeated time after time upon each half revolution of the shaft 93.

The apparatus thus far described, when operated in the range of 300 punching cycles per second, is normally difficult to lubricate and one of the objects of the invention is to maintain all elements of the punch properly lubricated. In order to minimize the lubrication problems in accordance with the present invention, the compartments 1 and 2 are filled with oil to about the center line of the shaft 93. The compartments should not be completely filled with the oil since the viscous drag introduced by such an arrangement would constitute a very decided load on the drive system. By filling the casings to the line 151 which passes through the center of the shaft 93, most of the parts are adequately lubricated. The cam 73, as a result of its rapid rotation, produces a dwell in the oil immediately surrounding it so that the oil presents relatively little frictional resistance to rotation of the shaft. At the same time, the movement of the cam and its counter weight 106 splash oil through the entire compartment 1 thereby lubricating all moving surfaces with a sufficient quantity of oil to prevent damage to any of these parts as a result of lack of lubrication. The apertures 32 in the punch guide 22 receive the punch pins 31 relatively snugly and therefore upon upward movement of the punch pins through the apertures 32, any excess oil on the pin is removed.

The splash lubrication system described is adequate for most of the parts of the apparatus but does not properly lubricate the feed cam 113 and its follower 112 or the oil seal 132. The oil seal 132 which is required as a result of the fact that the shaft 114 is movable in the aperture in wall 28 remains an effective oil seal only so long as it is bathed in oil. Adequate lubrication for the oil seal 132 and for the feed cam 113 and the follower 112 is provided by the pump including the Archimedes screw section 96 of the shaft 93 and its housing 97. The oil in the respective housings which is maintained at the line 151, fills the space adjacent to the inlet 103 to the aforesaid pump and therefore large quantities of oil may be pumped through the outlet orifice 104. A tube (not illustrated) is attached to receive oil from the orifice 104 and extends upwardly through the housing to direct a stream of oil on the top of the cam 113. Another stream of oil is directed against the oil seal 132. Thus, all parts of the mechanism receive large amounts of lubrication without requiring the elements to run in an oil bath in which appreciable drive power would be dissipated in churning oil.

Returning again to FIGURE 9 it will be noted that the interval permitted for moving the punch code interposers 46 into and out of position constitutes the interval required for the shaft 93 to rotate through 60°. However, the interval permitted to insert the pawl between the teeth 110 on the toothed wheel 109 constitutes the interval required for the shaft 93 to rotate 30° and another 30° interval is permitted for withdrawing the pawl from the teeth on the wheel 109. Since only thirty degrees of rotation of the shaft 93 is permitted for movement of the armature 139, the field of one of the magnets 141 and 142 must be completely or substantially completely collapsed during this interval and the field of the other of the magnets 141 and 142 must be brought up to full strength. As the speed of the operation of the punch is increased some difficulty is experienced in collapsing and building up the fields of these magnets in the allowed time and very large amounts of energy must be delivered during a very short interval so as to overcome the lag in decay of the flux in the magnet that has just been deenergized. In order to avoid, where necessary, this requirement for very large amounts of energy being delivered during short time intervals, resort is had to the embodiment of the invention illustrated in FIGURES 10 through 13.

Figure 10:
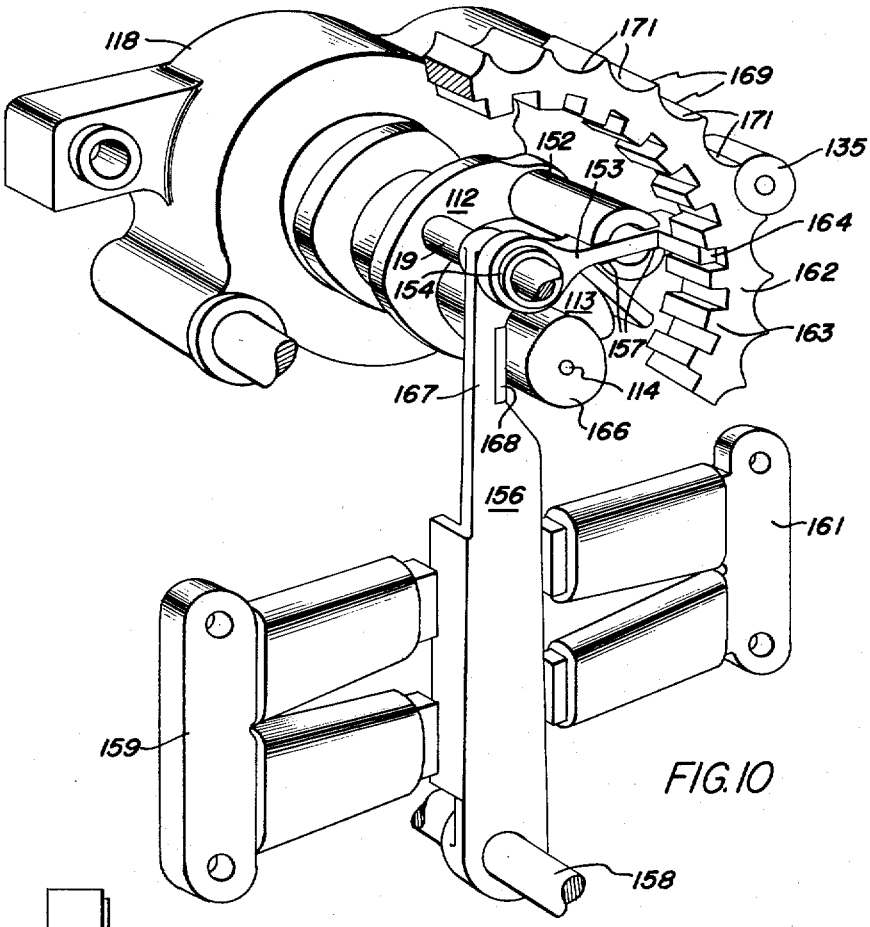
FIGURE 10 is a perspective view of a modified form of the feed drive mechanism of the apparatus of the invention.
Figure 11:
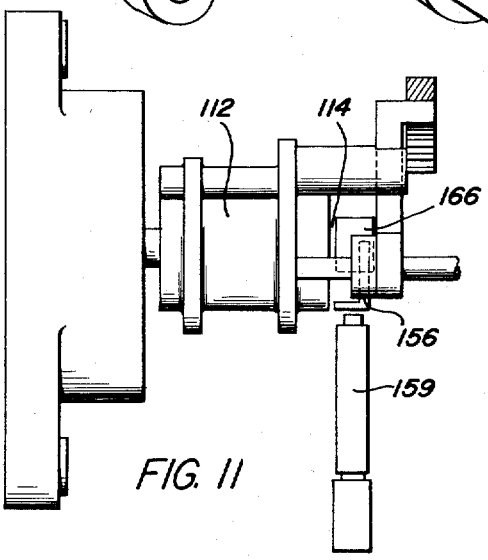
FIGURE 11 is a side view of the modified drive mechanism.
Figure 12:
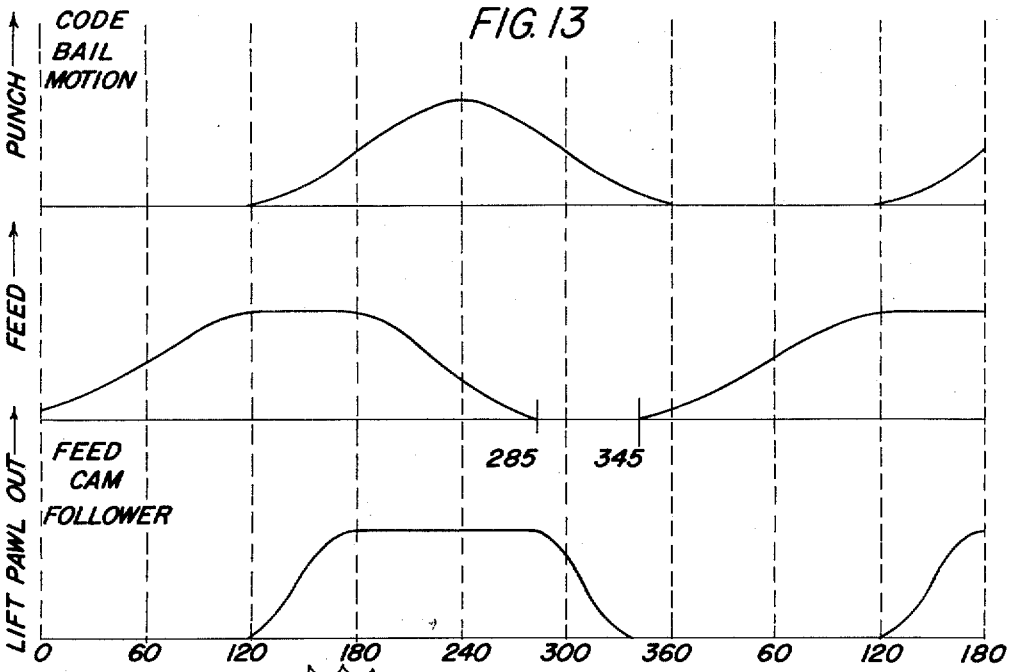
FIGURE 12 is a front view of the modified apparatus of the invention.
Figure 12:
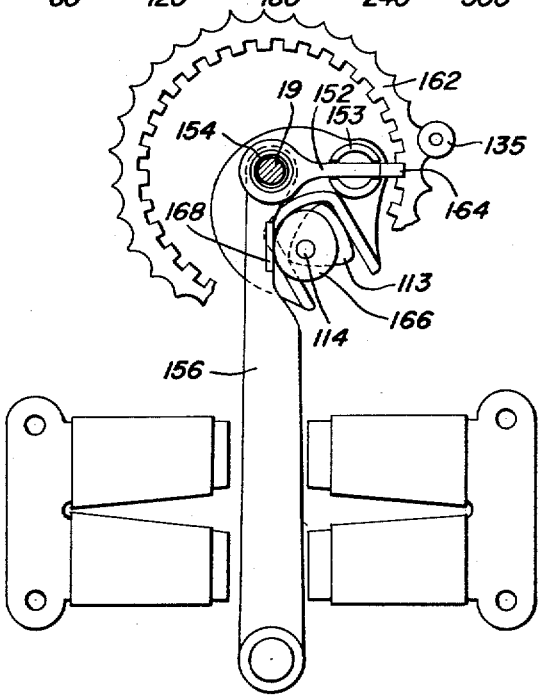

Reference is now made to FIGURES 10 through 12 wherein those elements which are common to both embodiments of the invention carry the same reference numerals. In this embodiment of the invention, the housing 118 supports the cam shaft 114 and is itself secured to the wall 16 of the compartment 2 in the same manner as the housing 116 in the first embodiment of the invention. The cam follower 112 is the same as that employed in the first embodiment of the invention but in this embodiment of the invention the follower is rotated about the shaft 19 so that the U-shaped portion of the follower 12 is positioned at about a 30° angle with respect to the vertical and is directed toward the right of the apparatus as viewed in FIGURE 1 and also in FIGURES 10 and 12. The cam follower 112 is rotatable on the shaft 19 and is provided with a hollow cylindrical shaft 152 which extends toward the viewer and therefore toward the compartment 1 of the mechanism. A pawl 153 is rotatably secured to a hollow cylindrical collar 154 which forms an upper end of an electromagnetic armature 156. The hollow cylindrical collar 154 is disposed about the shaft 19 and has an inside diameter which is considerably larger than the outside diameter of the shaft so that the armature may be moved a distance sufficient to couple the pawl 153 to a toothed wheel 162. The pawl 153 constitutes substantially a straight member which extends through a slot 157 in the hollow cylindrical shaft 152 secured to the cam follower 112. The shaft 152 serves the dual function of providing a guide for the pawl 153 when it is moved into and out of engagement with its associated toothed wheel and further serves to rotate the pawl about the collar 154 or more specifically about the shaft 19 upon movement of the cam follower 112. The armature 156 is pivoted about a shaft 158 which is parallel to the shaft 19 and disposed below two electromagnets 159 and 161 disposed on opposite sides of the armature 156, the magnets 159 and 161 are adapted when each is energized to attract the armature 156 to it, thereby producing rotation of the armature about the shaft 158 and in turn producing substantially translatory motion of the pawl 153. Actually, the end of the pawl 153 secured to the collar 154 rotates about the shaft 158 but the length of the armature 156 is such compared with the arc of movement of its upper end that the movement of the pawl may be considered to be translatory, for purposes of explanation, rather than rotational.

In this embodiment of the invention, the toothed wheel is formed on the inner circumferential surface of the hollow hub 107 on which the sprocket 4 is supported. The toothed wheel 162 is provided with a plurality of square teeth 163, the spacing between the teeth being adapted to snugly receive a square tooth 164 on the end of the pawl 153 remote from the shaft 19. When the armature 156 is in its counterclockwisemost position, that is, is rotated about the shaft 158 toward the magnet 159, the tooth 164 of the pawl 153 is withdrawn from between the teeth 163 of the toothed wheel 162. Upon rotation of the armature 156 toward the electromagnet 161, the tooth 164 of the pawl 153 is inserted between the square teeth of the toothed wheel 162 so that when the cam follower 112 is rotated about the shaft 19 the toothed wheel and therefore the tape drive sprocket 4 is rotated therewith.

In the present embodiment of the invention, the magnet 159 is not employed to rotate the armature 156 counterclockwise about the shaft 158 but is employed merely as a magnetic detent to hold the armature in its counterclockwise position after it has been positioned by other means. The energy stored in the field of magnet 159 is quite small compared with the energy to be stored in the field of the magnet 161, therefore when the electromagnet 161 is energized and 159 de-energized, only a very small residual field of the magnet 159 must be overcome. In consequence the requirements for power delivered to the electromagnet 161 are considerably reduced with respect to the power required for this operation in the first embodiment of the invention.

In the present embodiment of the invention, a cam is employed to return the armature 156 to its counterclockwisemost position. More particularly, a cam 166 is secured to the shaft 114 to which the triangular cam 113 is also secured. As illustrated particularly in FIGURE 11, the triangular cam 113 is axially disposed wholly within the cam follower 112, while the cam 166 extends to the right, as viewed in this figure and forwardly as viewed in FIGURES 10 and 12 of the cam follower and is disposed adjacent the armature 156. The cam 166 is positioned such, as a result of the relative positions of the shafts 114 and 19, that the cam engages a region 167 of the armature near the upper end of the armature. It will be noted that the armature 156 is vertically elongated with respect to the armature employed in the first embodiment of the invention. The cam 166 is contoured such that during the interval when it is desired to withdraw the pawl 153 from engagement with the toothed wheel 162, a hard metallic insert 168 in the portion 167 of the armature 156 is contacted by the cam and a gradually increasing pressure is applied to the armature so that it is rotated counterclockwise. At this point it should be noted that the cam 166 could be employed for moving the pawl 153 into engagement with the toothed wheel 162 by merely rotating the entire mechanism such that the cam 166 is disposed on the left side of the armature 156 rather than the right side as viewed in FIGURES 10 and 12.

The timing operations of the second embodiment of the invention illustrated in FIGURES 10 through 12 are illustrated in FIGURE 13 which is a graph of the motion of the punch bail 39, the feed cam follower 112 and the pawl withdrawing cam 166. During the first 120° of rotation of the feed cam shaft 114 or 60° of rotation of the punch shaft 93, the punch bail 39 is stationary, this being the interval during which the code interposers 46 are inserted and/or withdrawn. During the same 120° interval, the cam follower 112 is rotated counterclockwise and therefore optionally rotates the toothed wheel 162. The position of the cam 166 during this interval is immaterial just so long as it does not exert a counterclockwise force on the armature 156. During the interval from 120° to 240° of rotation of shaft 114, the punch bail 39 moves upwardly to its uppermost position and then during the interval from 240° to 360° of rotation of the shaft 114, the bail is returned to its lowermost position to complete a punching operation. Concurrently, from 120° to 180° of rotation of shaft 114, the cam follower 112 remains stationary and the cam 156 engages the insert 168 in the armature 166 and exerts a counterclockwise force thereon to return the armature to its counterclockwisemost position. During the interval from 180° to 285°, the cam follower 112 is rotated clockwise to the position illustrated in FIGURE 9 thereby returning the pawl 153 to its starting or clockwisemost position. During this same interval, that is, from 180° to 285°, the cam 166 remains in contact with the armature 156 at its counterclockwisemost position but does not exert any further force thereon and merely prevents the armature from being rotated clockwise. During the interval from 285° to 345° of rotation of the shaft 114, the cam follower 112 is again stationary and the pawl may again be inserted between the teeth 163 of the wheel 162, the cam gradually withdrawing from the armature 156 so that the armature may follow it in a clockwise direction so as to permit the pawl to move the required distance. Thus, the cam 166 may be employed not only to return the armature 156 to a pawl retracted position but also to hold the pawl in this position until the cam follower 112 has returned to the position where another feed cycle can be initiated. The electromagnet 159 may be eliminated since the cam 166 prevents the armature 156 from rotating clockwise but it is preferable to employ the detenting electromagnet 159 to prevent chattering of the armature. The surfaces of the cam 166 are contoured somewhat similarly to those of the triangular cams 73 and 113 in that the contact between the cam and its follower insert 168 is initially quite gradual producing minor acceleration forces and only producing rapid acceleration after a firm contact has been established between the cam and its follower. Thus, in all of the cam follower arrangements employed in the apparatus, impact due to sudden assumption of loads is prevented. The arrangement of the toothed wheel of the clutch along the internal circumference of the hub 4 provides an additional advantage not previously indicated. The advantage of the internal toothed wheel over the wheel employed in the first embodiment of the invention resides in the detent medium. Referring momentarily to FIGURE 5 of the accompanying drawings, it will be noted that the spring loaded detent 135 engages the square teeth 110 of the wheel 109. So long as the surface of the detent 135 engages an edge of one of the teeth 110 it will exert a centering force on the wheel. However, if a feed operation terminates with the detent 135 positioned on a flat toothed surface, then no detent force is provided. Further, pointing of the upper surface of the teeth 110 to insure correct detenting, would necessitate a longer stroke for pawl 111 thereby increasing time required for interposer insertion. In the embodiment of the invention illustrated in FIGURE 10 the outer surface of the hub 162 adjacent the teeth 163 is provided with a plurality of concave, pointed teeth 169 having concave surfaces 171 subsisting therebetween. Thus, the arrangement where the detent might engage a flat surface of the tooth is eliminated and a positive detenting force over the entire surface of the drum 109 is provided.

The tape transport mechanism of the present invention, involving the combination of a dog clutch and a triangular cam and follower mechanism has broad applicability in the field of tape handling and processing equipment and is in no way limited to utilization with tape punching equipment. The tape transport may be employed in tape verifiers, readers, punches, printers, and in other tape handling equipment.

While we have described and illustrated two specific embodiments of our invention, it will be clear that variations of the general arrangement and of the details of construction which are specifically illustrated and described may be resorted to without departing from the true spirit and scope of the invention as defined in the appended claims.

1. A mechanism for operating upon a length of material comprising a rotatable drive member for engaging and transporting the length of material, a toothed wheel coaxial with and secured to said drive member, a pawl having a tooth, means for restraining said pawl to move with respect to at least two axes, a first of said axes being shiftable between a first position and a second position essentially coaxial with the axis of said toothed wheel and a second of said axes offset from and parallel to the axis of the toothed wheel, means for *at will* moving said pawl in a first direction with respect to said second axis to effect insertion of said tooth of said pawl between teeth of said toothed wheel and for shifting said first axis to said second position, means for moving said pawl in a second direction with respect to said second axis to effect removal of said tooth of said pawl from between the teeth of said toothed wheel and for shifting said first axis to said first position, and first drive means to effect movement of said pawl in a first direction with respect to said first axis when said tooth of said pawl is disposed between said teeth of said toothed wheel and to move said pawl in a second direction with respect to at least said first axis when said tooth of said pawl is withdrawn from between said teeth of said wheel.

2. The combination in accordance with claim 1, wherein said second axis passes through said pawl.

3. The combination in accordance with claim 1, wherein said drive means comprises a constant diameter triangular cam, a rotatable shaft passing through the center of curvature of one side of said triangular cam, a cam follower having opposed surfaces contacting said cam, said cam follower being rotatable about the axis of said toothed wheel and wherein said means for restraining said pawl comprises means for interconnecting said pawl and said cam follower to effect movement of said pawl with respect to said first axis.

4. The combination in accordance with claim 3, wherein said means for moving said pawl about said second axis and for shifting said first axis of said pawl comprises an electromagnetic means having a movable armature and link means interconnecting said armature and said pawl.

5. The combination in accordance with claim 4, wherein said armature has one end rotatable about an axis parallel to the axis of said toothed wheel and includes a second end having an aperture therein, said axis of said toothed wheel passing through said aperture in said armature, the axis of said aperture constituting said first axis of said pawl.

6. The combination in accordance with claim 1, wherein said means for effecting movement of said pawl comprises a constant diameter triangular cam, a rotatable shaft passing through the center of curvature of one side of said triangular cam, a cam follower having opposed surfaces contacting said cam, said cam follower being rotatable about the axis of said toothed wheel.

7. The combination in accordance with claim 6, wherein said means for moving said pawl about said second axis in one direction comprises an electromagnetic means having an armature, said armature having one end rotatable about an axis parallel to the axis of said toothed wheel and including a second end, and means for rotatably securing said pawl to said second end of said armature, the axis of rotation of said armature constituting the second axis of movement of said pawl.

8. The combination in accordance with claim 7, wherein said second end of said armature is apertured and wherein the axis of said toothed wheel passes through said aperture, the axis of said aperture constituting said first axis of said pawl.

9. The combination in accordance with claim 8, wherein said means to effect movement of said pawl about said first axis comprises a slotted member secured to said cam follower, said pawl having a section thereof slidably disposed in the slot in said slotted member.

10. The combination in accordance with claim 7, wherein said means for moving said pawl about said second axis further comprises, a further cam secured to said shaft for said triangular cam, said further cam contacting said armature to produce movement of a pawl in said second direction.

11. The combination in accordance with claim 1, further comprising a material marking member reciprocatable between a rest position and a material marking position, record drive means for selectively reciprocating said marking member between said positions, and means for maintaining said drive means in isochronism with said means to effect movement of said pawl, said drive means imparting a complex movment to said marking member such that it is maintained stationary in said rest position during substantially all of those intervals that said pawl is in driving engagement with said toothed wheel, and is rapidly driven to said marking position and returned to said rest position during remaining intervals of operation of said pawl.

12. The combination in accordance with claim 11, wherein said second drive means comprises a constant diameter cam, a cam follower having opposed surfaces contacting said cam, a fixed support, parallel links interconnecting said opposed surfaces of said cam follower and said fixed support, a marking member bail restrained to reciprocate a link interconnecting said cam follower and said bail, means for selectively coupling said marking member to said bail, said triangular cam associated with said bail being driven at twice the rotational velocity as said triangular cam associated with said first drive means.

13. The combination in accordance with claim 11, wherein said record drive means comprises a second constant diameter triangular cam, a cam follower having opposed surfaces contacting said cam, means for rotating said cam at one half the rate of rotation of said triangular cam associated with said toothed wheel, a marking member bail, means for driving said bail from said cam follower in a reciprocating motion, said means for driving including frequency doubling means and means for selectively coupling said marking member to said bail for reciprocation thereby.

14. The combination in accordance with claim 11, wherein said second drive means includes means disposed above said record drive means for guiding said marking member and means for driving said marking member upwardly from its rest to its marking position.

15. The combination in accordance with claim 14, wherein said marking member and said record drive means are disposed within a sealable container, said container being filled with oil to a level enveloping at least a part of said record drive means.

16. The combination in accordance with claim 15, wherein said second triangular cam is provided with a cam shaft, an oil pump disposed in the oil in said container, said pump being driven by said cam shaft and means for directing oil supplied by said pump to predetermined elements of said mechanism.

17. The combination in accordance with claim 16, wherein said pump comprises a section of said cam shaft of said second cam, said section having a screw thread formed thereon.

18. The combination in accordance with claim 1, further comprising a hollow cylindrical member, said toothed wheel being formed on the inner circumferential surface of said hollow cylindrical member.

19. A mechanism comprising a marking member reciprocatable between a rest position and a marking position, a marking member bail reciprocatable between a rest position and a marking position, a shaft means perpendicular to said marking member, a pair of elongated arms each having one end secured to said bail and the other end rotatable about said shaft means, drive means for reciprocating said bail, and means for selectively coupling said marking member to said bail for reciprocation thereby.

20. A mechanism comprising a marking member reciprocatable between a rest position and a marking position, a marking member bail reciprocatable between a rest position and a marking position, a shaft means perpendicular to said marking member, a pair of elongated arms each having one end secured to said bail and the other end rotatable about said shaft means, a constant diameter triangular cam, a cam shaft secured to and coaxial with the center of curvature of one of the sides of said cam, a pair of parallel links each having one end rotatably secured to said cam follower and the other end rotatably secured to a fixed support, means for rotating said cam shaft, and link means interconnecting said cam follower and said bail so as to produce reciprocation of said bail.

21. A mechanism comprising a marking member reciprocatable between a rest position and a marking position, a marking member bail, means for restraining said bail to follow a reciprocating motion between a rest position and a marking position, a constant diameter triangular cam, a cam shaft secured to and coaxial with the center of curvature of one of the sides of said cam, a cam follower, a pair of parallel links each having one end rotatably secured to said cam follower and the other end rotatably secured to a fixed support, means for rotating said cam shaft, and link means interconnecting said cam follower and said bail so as to produce reciprocation of said bail.

22. The combination in accordance with claim 21, further comprising an oil pump, said pump including a section of said cam shaft, said section of said cam shaft having a screw thread formed thereon.

23. The combination in accordance with claim 21, wherein said cam follower is disposed below said marking member, a marking member guide disposed above said bail, said guide having an aperture for snuggly receiving said marking member, an oil tight container for said mechanism, said container being adapted to be filled with oil to about the horizontal center line of said cam shaft.

24. The combination according to claim 3 wherein said cam follower is maintained stationary during insertion and withdrawal of said pawl with respect to the teeth of said tooth wheel.

25. The combination according to claim 1 wherein said second axis is remote from said pawl.

26. A mechanism comprising a shaft, a first cam secured to said shaft for rotation therewith, a cam follower disposed in following engagement with said first cam, said cam follower being arranged to have a cyclic movement imparted thereto in response to rotation of said first cam, a movable member, a coupling pawl member movable both in response to and independently of said cam follower, a first means for moving said coupling pawl member into engagement with said movable member at a first predetermined point in the cyclic movement of said cam follower, and second means for moving said coupling member out of engagement with said movable member at a second predetermined point in said cycle, at least one of said first and second means comprising a second cam secured to said shaft for rotation therewith to effect actuation of said pawl member, said second cam having a predetermined angular position on said shaft with respect to said first cam.

27. The combination according to claim 26 wherein said movable member is a hollow cylindrical element and includes a plurality of symmetrical teeth formed on the inner periphery thereof and wherein said coupling member is a pawl which engages said movable member between said teeth.

*28. The combination according to claim 5 wherein said armature is rotatable about an axis remote from and parallel to said center of rotation, said pawl actuating mechanism including an annulus connected to said armature, the center of rotation of said toothed rotary element passing through said annulus and the axis of said annulus constituting said movable axis.*

*29. The combination according to claim 11 wherein said means for rotating said pawl comprises a first constant diameter triangular cam, a rotatable shaft passing through the center of curvature of one side of said first triangular cam, a first cam follower contacting said first triangular cam, said cam follower being rotatable about the center of curvature of said toothed rotary element and an element for transmitting rotation of said cam follower to said pawl.*

*30. In a system for generating intermittent rotary motion of a hollow rotary element having teeth formed on the inner periphery thereof and having a center of rotation, a pawl actuating element carrying a movable axis, means for moving said pawl actuating element so as to move its axis between two positions, said axis being coincident with said center of rotation of said rotary element in one of said positions, a pawl rotatably secured to said pawl actuating element for rotation about said axis and for insertion between said teeth when said pawl actuating means is moved to said one position, and means for rotating said pawl about said axis when said axis is in its said one position to rotate said rotary element.*

*31. In a system for generating intermittent rotary motion of a toothed rotary element having a center of rotation, a pawl actuating mechanism carrying a movable axis, means for moving said pawl actuating mechanism to shift said movable axis between two positions, said movable axis being coincident with said center of rotation of said toothed rotary element in one of said two positions, a pawl pivotally secured to said pawl actuating mechanism and movable into and out of engagement with the teeth of said toothed rotary element in response to said axis being moved to said one and another of said two positions, respectively, and means for rotating said pawl about said movable axis to generate said intermittent rotary motion only while said axis is in said one of said two positions and for rotating said pawl in a direction opposite to said first direction only while said pawl is out of engagement with said teeth.*

*32. The combination according to claim 31 wherein said means for moving said axis comprises an electromagnetic means having an armature, said pawl actuating mechanism including an apertured element connected to said armature, said center of rotation passing through the aperture, the axis of the aperture constituting said movable axis, means connecting said apertured member to said pawl to move said pawl into and out of engagement with said toothed rotary element in accordance with movement of said apertured element.*

*33. The combination according to claim 32 wherein said pawl is pivotally connected to said apertured element, a cam follower rotatable about said center of rotation, a slotted member secured to said cam follower and said pawl having a section thereof slidably disposed in the slot in said slotted member.*

*34. The combination according to claim 33 wherein said means for moving said axis further comprises another rotatable cam, said another cam contacting said pawl actuating mechanism for moving said axis from said one to the other of said two positions.*

*35. The combination according to claim 31 wherein said toothed rotary element has a hollow section thereof and wherein said teeth of said toothed rotary element are formed on the inner periphery of said hollow section.*

References Cited in the file of this patent or the original patent

UNITED STATES PATENTS 2,858,816 MacNeill ---------- Nov. 11, 1958